US008412208B2

(12) United States Patent
On et al.

(10) Patent No.: US 8,412,208 B2
(45) Date of Patent: Apr. 2, 2013

(54) AUTONOMOUS FRACTIONAL TIME REUSE

(75) Inventors: Hanson On, Escondido, CA (US); Fei Frank Zhou, Milpitas, CA (US)

(73) Assignee: AirHop Communications, Inc., San Diego, CA (US)

( * ) Notice: Subject to any disclaimer, the term of this patent is extended or adjusted under 35 U.S.C. 154(b) by 0 days.

(21) Appl. No.: 13/270,486

(22) Filed: Oct. 11, 2011

(65) Prior Publication Data

US 2012/0088517 A1 Apr. 12, 2012

Related U.S. Application Data

(60) Provisional application No. 61/392,347, filed on Oct. 12, 2010.

(51) Int. Cl.
*H04W 16/00* (2009.01)
(52) U.S. Cl. ........ 455/447; 455/450; 455/446; 370/346; 370/337; 370/330
(58) Field of Classification Search .................. None
See application file for complete search history.

(56) References Cited

U.S. PATENT DOCUMENTS

| 2005/0152280 | A1* | 7/2005 | Pollin et al. ........... 370/252 |
| 2007/0086406 | A1* | 4/2007 | Papasakellariou ........... 370/343 |
| 2009/0080386 | A1* | 3/2009 | Yavuz et al. ........... 370/337 |
| 2009/0086861 | A1* | 4/2009 | Yavuz et al. ........... 375/346 |
| 2009/0135761 | A1* | 5/2009 | Khandekar et al. ........... 370/328 |
| 2011/0081865 | A1* | 4/2011 | Xiao et al. ........... 455/63.1 |

* cited by examiner

*Primary Examiner* — Marcos Batista
*Assistant Examiner* — Keith Fang
(74) *Attorney, Agent, or Firm* — Van Pelt, Yi & James LLP

(57) ABSTRACT

Autonomous fractional time reuse is provided. In some embodiments, autonomous fractional time reuse includes determining a number of neighboring base stations of a base station in a heterogeneous network; and pseudo randomly selecting one or more Fractional Time Reuse (FTR) slots for transmission by the base station. In some embodiments, the one or more FTR slots are autonomously selected by the base station without coordinating the selection of the one or more FTR slots with one or more of the neighboring base stations.

30 Claims, 5 Drawing Sheets

AUTONOMOUS FRACTIONAL TIME REUSE

CROSS REFERENCE TO OTHER APPLICATIONS

This application claims priority to U.S. Provisional Patent Application No. 61/392,347 entitled AUTONOMOUS FRACTIONAL TIME REUSE filed Oct. 12, 2010, which is incorporated herein by reference for all purposes.

BACKGROUND OF THE INVENTION

Fractional Time Reuse (FTR) is one of the network planning approaches used in heterogeneous cellular networks to maximize a frequency reuse factor and minimize inter-cell interference, such that a base station has the knowledge of its neighboring base stations (e.g., via Automatic Neighbor Relation (ANR)), and can stagger the radio resource allocations of cell edge User Equipment (UE) with respect to its neighbors. The FTR approach can be effective, such as for networks with frequency reuse factor one. In FTR, UE measurement reports (e.g., CQI, CPICH RSCP, and CPICH Ec/No) are analyzed to gain knowledge of UE's downlink signal condition. FTR factor (M) is typically computed and coordinated based on network topology and neighbor relationship. Grouping of the UEs is performed based on available UE measurement reports. In addition, network planning on which subframe(s) to transmit out of every M subframes for UE under strong inter-cell interference (i.e., cell edge UEs) is carried out.

For example, the transmit subframe(s) for cell edge transmission can be exclusive within a neighboring group. FTR can be deployed as centralized, distributed, or hybrid.

BRIEF DESCRIPTION OF THE DRAWINGS

Various embodiments of the invention are disclosed in the following detailed description and the accompanying drawings.

DETAILED DESCRIPTION

Figure 1:
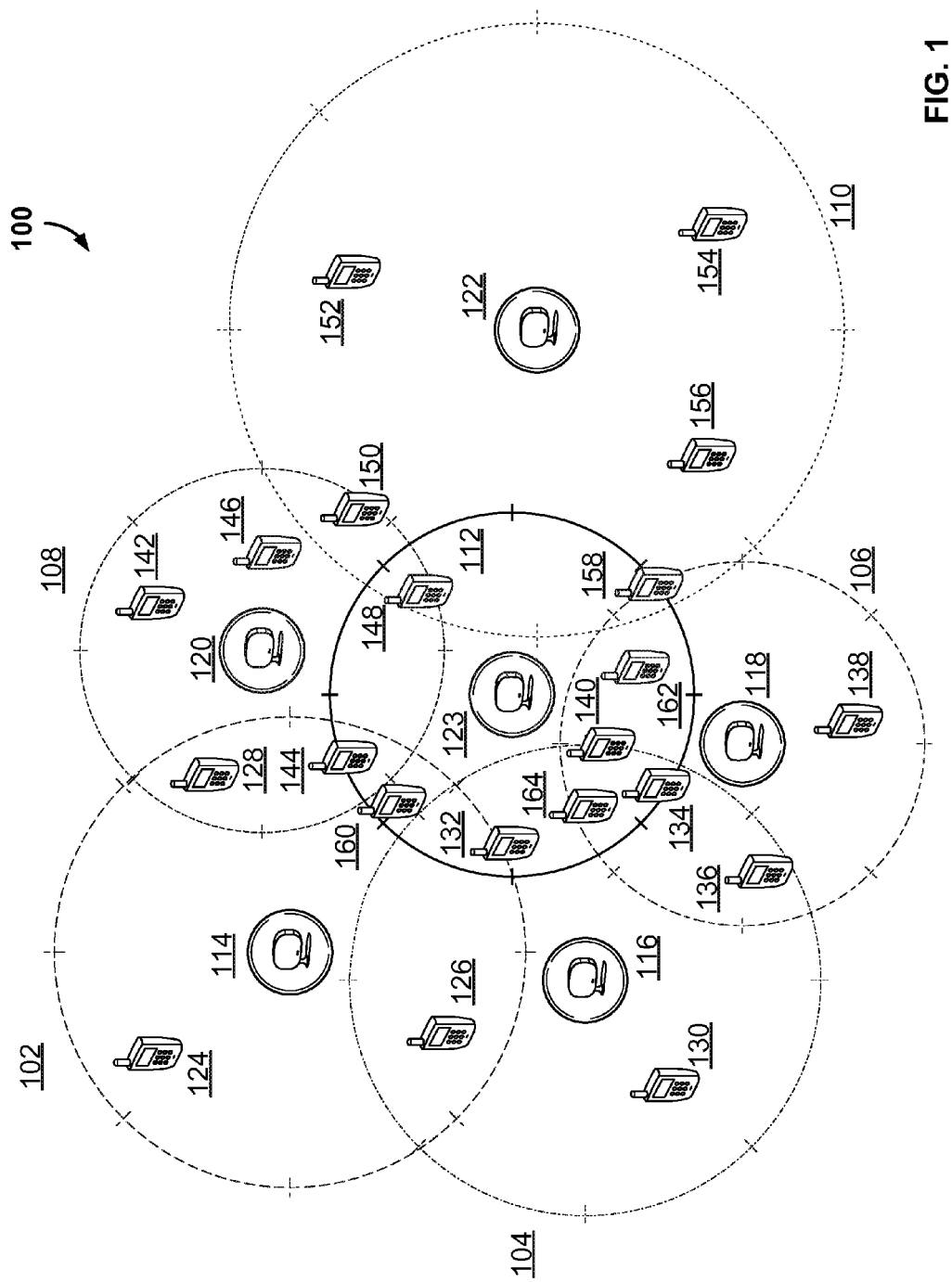
FIG. 1 illustrates an autonomous FTR enabled network topology in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The Fractional Time Reuse (FTR) approach generally requires that User Equipment (UE) measurement reports and knowledge of neighbors (e.g., via server or peer-to-peer communications) are available to the base stations.

However, in today's heterogeneous wireless networks (e.g., 3G cellular networks and 4G cellular networks), the knowledge of neighbors is not always available, which makes FTR deployment challenge. In particular, with the increasing deployment of a greater number of small cells (e.g., femtocells and picocells) to deal with capacity demands, there is an increasing potential for interference at cell edge areas with lots of overlapping small cells in these cell edge areas. An approach without the dependency of the knowledge of neighbors would make FTR deployment easier and more practical.

Using FTR techniques, at any given time slot, only one cell can transmit (e.g., and can also transmit at that time slot using lower power to transmit). However, such FTR techniques require advanced coordination among neighboring base stations to pre-agree on an FTR time slots allocation, which can be difficult to implement as such advanced coordination among multiple base stations requires time and necessitates that agreement be reached by such coordinating base stations.

Thus, what is needed are autonomous FTR techniques that do not require such advanced coordination among neighboring base stations to pre-agree on an FTR time slots allocation.

Accordingly, autonomous fractional time reuse is provided. In some embodiments, methods and apparatus of pseudo random process based Fractional Time Reuse (FTR) techniques for heterogeneous cellular network are provided. In some embodiments, methods and apparatus of pseudo random process based Fractional Time Reuse (FTR) techniques for heterogeneous cellular network that is subject to higher frequency reuse factor and inter-cell interference.

In some embodiments, autonomous fractional time reuse includes determining a number of neighboring base stations of a base station (e.g., a femtocell, a picocell, a microcell, or a macrocell) in a heterogeneous network; and pseudo randomly selecting one or more Fractional Time Reuse (FTR) slots for transmission by the base station. In some embodiments, the one or more FTR slots are autonomously selected by the base station without coordinating the selection of the one or more FTR slots with one or more of the neighboring base stations. In some embodiments, the number of neighboring base stations of the base station in a heterogeneous network is determined during a downlink scanning and user equipment measurement for estimating the number of neighboring base stations and the signal strength of each of the neighboring base stations.

In some embodiments, autonomous fractional time reuse further includes monitoring for inter-cell interference; and pseudo randomly selecting one or more different FTR slots for transmission by the base station based on the monitored inter-cell interference.

In some embodiments, autonomous fractional time reuse further includes selecting an FTR factor that is mathematically much greater (e.g., five times or more) than an estimated average number of neighboring base stations in the heterogeneous network to provide for a greater number of FTR slots to reduce potential inter-cell interference.

In some embodiments, autonomous fractional time reuse further includes autonomously selecting an FTR factor using a pseudo random distribution model; and composing the selected FTR factor and transmit subframe(s) into radio resource constraints for one or more user equipment devices associated with a cell edge group (e.g., and the selected FTR factor is not applied to user equipment devices associated with a cell center group).

In some embodiments, autonomous fractional time reuse further includes autonomously selecting an FTR factor $\hat{M}$ using a pseudo random distribution model; composing the selected FTR factor and transmit subframe(s) into radio resource constraints; and executing a MAC scheduler, in which radio resource constraints are received at the MAC scheduler, and in which the MAC scheduler only schedules m transmit subframes out of every $\hat{M}$ subframes for each user equipment device with a predicted location in an overlapped cell coverage area.

In some embodiments, methods and apparatus for autonomous FTR are provided that can be applied to a heterogeneous cellular network, such as a 3G/4G heterogeneous cellular network and/or other heterogeneous cellular networks as well as other wireless networks. In some embodiments, an autonomous FTR system is provided for optimizing network throughput, mitigating inter-cell interference, and maximizing a wireless network frequency reuse factor.

In some embodiments, autonomous FTR techniques are provided that include enabling a base station to employ FTR autonomously. In some embodiments, autonomous FTR techniques are provided that include generating an FTR factor autonomously (e.g., without advanced coordination among neighboring base stations to pre-agree on an FTR time slots allocation).

In some embodiments, autonomous FTR techniques are provided that include a downlink scanning process for estimating the number of neighboring cells (e.g., neighboring base stations) and their signal strength. In some embodiments, autonomous FTR techniques are provided that include analyzing UE measurement reports and grouping the UEs (e.g., grouping UEs into cell center groups and cell edge groups, in which cell edge groups include UEs under strong inter-cell interference). In some embodiments, autonomous FTR techniques are provided that include selecting the transmit subframe(s) for UEs under strong inter-cell interference.

In some embodiments, autonomous FTR techniques are provided that include generating a radio resource constraint. In some embodiments, autonomous FTR techniques are provided that include applying radio resource constraints.

For example, using autonomous FTR techniques disclosed herein, each base station can autonomously determine what time slot it will transmit based on a random process. Using a suitably random process, the risk that the selected FTR slots will result in inter-cell interference is minimized. Each BTS can use the same random process with different random seeds. Each base station can also continue to monitor measurement reports, to determine whether the inter-cell interference has improved. If no improvement is detected, then the autonomous FTR slot selection process can be repeated to autonomously select a different FTR slot.

FIG. 1 illustrates an autonomous FTR enabled network topology in accordance with some embodiments. In particular, FIG. 1 illustrates a heterogeneous cellular network with a frequency reuse factor of one 100 in accordance with some embodiments. As shown, the frequency reuse one heterogeneous cellular network with a frequency reuse factor of one 100 includes different types of cells (e.g., base stations) sharing the same frequency. For example, the base stations can be macrocells, microcells, picocells, and/or femtocells. At the center of each cell 102, 104, 106, 108, 110, and 112 as shown, there is a base station 114, 116, 118, 120, 122, and 123, respectively, providing cellular service (e.g., voice, data) over the air to UEs. As shown, cell 102 includes base station 114, and UEs 124, 126, and 128; cell 104 includes base station 116, and UEs 130, 132, and 134; cell 106 includes base station 118, and UEs 136, 138, and 140; cell 108 includes base station 120, and UEs 142, 144, 146, and 148; cell 110 includes base station 122, and UEs 150, 152, 154, 156, and 158; and cell 112 includes base station 123, and UEs 160, 162, and 164.

As also apparent in FIG. 1, each of these cell areas includes cell edge areas in which one or more UEs are in overlapping cell areas of neighboring base stations. In particular, each cell's footprint, or coverage area, varies and can overlap with neighboring cells. In this network topology, UEs located in the overlapped coverage areas sense stronger signals from the neighbor cells compared to those outside the overlapped coverage areas. As shown in FIG. 1, various of the UEs are in center cell areas (e.g., can be grouped into cell center groups), and various of the UEs are in cell edge areas (e.g., can be grouped into cell edge groups). For example, UE 150 is in communication with base station 122 but is located in an overlapping cell area with neighboring base station 120 as shown. Similarly, UE 158 is in communication with base station 122 but is located in overlapping cell areas with neighboring base stations 118 and 123 as shown.

In the frequency reuse one heterogeneous cellular network 100, stronger neighboring cell signal generally means higher interference level and poor quality of service. Effective inter-cell interference management is important to enhance the quality of service for UEs in overlapped coverage area and to improve the overall heterogeneous cellular network throughput as a whole.

In some embodiments, the base stations perform FTR autonomously to determine the radio resource assignment and constraints for UEs, in which downlink scanning is performed to estimate the number neighboring cells and neighboring cell signal strength. In some embodiments, this operation is performed periodically. In some embodiments, this operation is initiated by various events. In some embodiments, this operation is performed periodically and is also initiated by various events. In some embodiments, the estimated neighboring base station number and the measurements are analyzed and contribute to transmit power configuration and FTR factor generation (e.g., autonomous FTR factor selection).

Figure 2:
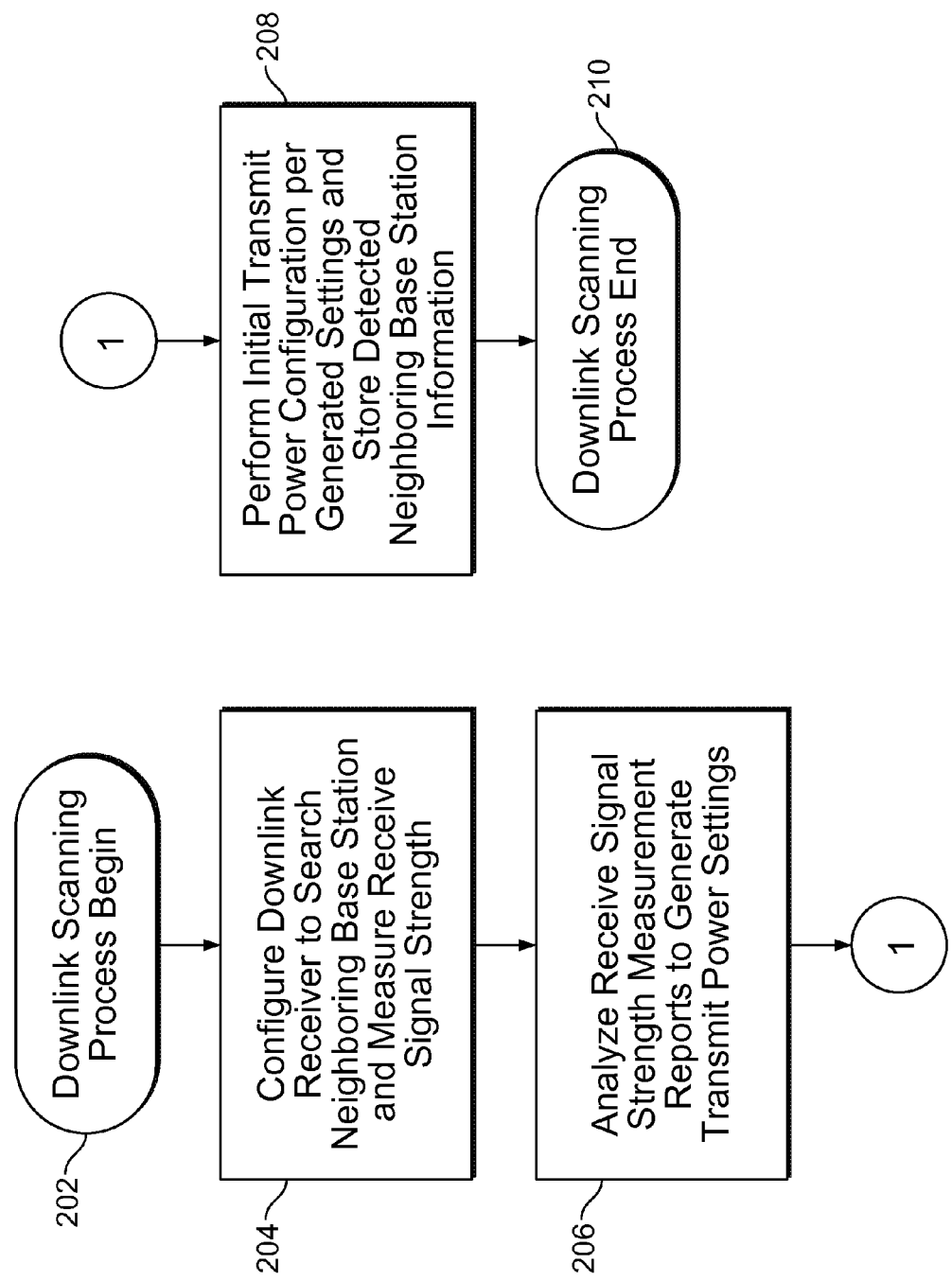
FIG. 2 illustrates a flow diagram for a downlink scanning process in accordance with some embodiments.

FIG. 2 illustrates a flow diagram for a downlink scanning process in accordance with some embodiments. As shown in FIG. 2, at 202, a downlink scanning process is initiated. At 204, a downlink receiver of a base station is configured to search for neighboring base stations and measure received signal strength of any such neighboring base stations. At 206, the received signal strength measurement(s) of any such neighboring base stations is analyzed to generate transmit power settings for the base station. At 208, an initial transmit power configuration per generated settings is performed and detected neighboring base station information is stored. At 210, the downlink scanning process is completed.

Figure 3:
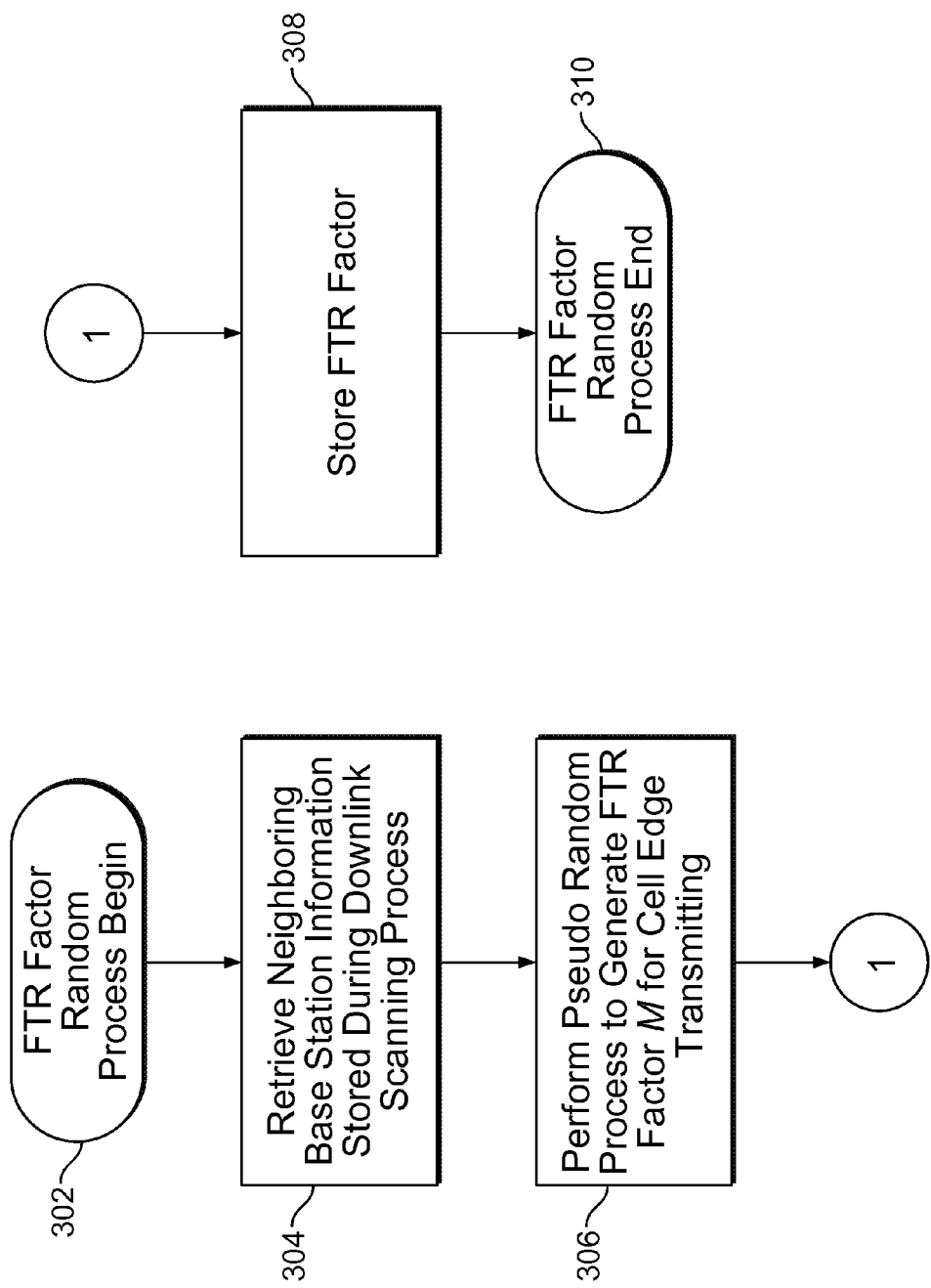
FIG. 3 illustrates a flow diagram for an FTR factor random process in accordance with some embodiments.

FIG. 3 illustrates a flow diagram for an FTR factor random process in accordance with some embodiments. As shown in FIG. 3, at 302, an FTR factor random process is initiated. At 304, neighboring base station information stored during the downlink scanning process is retrieved. At 306, a pseudo random process to generate an FTR factor M for cell edge transmitting is performed. At 308, the FTR factor M is stored. At 310, the FTR factor random process is completed.

In some embodiments, a pseudo random process is employed to select the FTR factor, $\hat{M}$, for UEs under strong inter-cell interference (e.g., located in overlapped coverage area, such as for UEs in cell edge areas that can be grouped into cell edge groups), such that $\overline{N}-\sigma \leq \hat{M} \leq \overline{N}+\sigma$, where $\overline{N}$ is typical number of neighboring base stations in a heterogeneous network (e.g., averaging the estimated number of neighboring cells determined during the downlink scanning process such as described herein with respect to FIG. 2);

$\hat{M}$ is the FTR factor generated by the pseudo random process; and $\sigma$ is the standard deviation of $\overline{N}$.

In some embodiments, this pseudo random process used to select an FTR factor can be repeated to select a different FTR factor if the measurement reports from UEs in overlapped coverage areas do not show improvement.

In some embodiments, a pseudo random process is employed to select the FTR factor, $\hat{M}$, such that $\hat{M}>\overline{N}$. For example, $\hat{M}$ can be selected to be five times or more greater then $\overline{N}$. Selecting an FTR factor much greater than $\overline{N}$ provides more freedom to the pseudo random process for selecting transmit subframe(s). In some embodiments, this process can be repeated if the measurement reports from UEs in overlapped coverage areas do not show improvement or the Quality of Service (QoS) requirements change for UEs in overlapped coverage areas.

Figure 4:
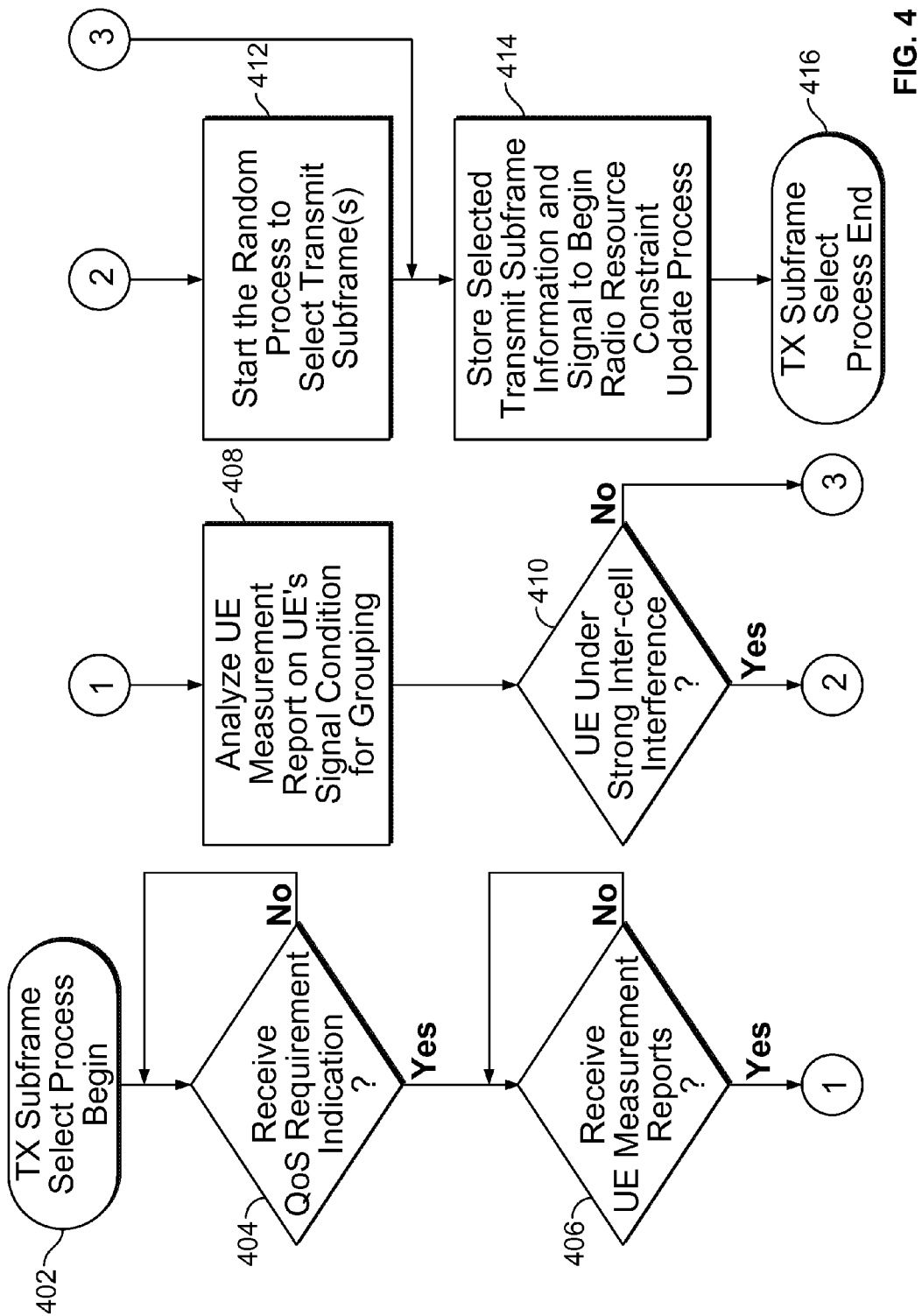
FIG. 4 illustrates a flow diagram for a cell edge transmit subframe select process in accordance with some embodiments.

FIG. 4 illustrates a flow diagram for a cell edge transmit subframe select process in accordance with some embodiments. At 402, a transmit (TX) subframe process is initiated. At 404, whether a QoS requirement indication has been received is determined. If not, then the process waits for the receipt of such QoS requirement indication. If the QoS requirement indication has been received, then the process continues. At 406, whether UE measurement report(s) have been received is determined. If not, then the process waits for the receipt of such UE measurement report(s). If the UE measurement report(s) have been received, then the process continues. At 408, the UE measurement report(s) is analyzed to determine each UEs signal condition for grouping into a cell edge group (e.g., for UEs under strong inter-cell interference) or a cell center group (e.g., for UEs that are not under strong inter-cell interference). At 410, for each UE that is under strong inter-cell interference, the process continues to 412, otherwise the process skips to stage 414. At 412, the random process to select transmit subframe(s) (e.g., such as the random process described above with respect to FIG. 3) is performed. At 414, the selected transmit subframe information is stored and signal to begin radio resource constraint update process is sent. At 416, the transmit (TX) subframe select process is completed.

In some embodiments, a process is employed for grouping UEs into a cell edge group (e.g., for UEs under strong inter-cell interference) or a cell center group (e.g., for UEs that are not under strong inter-cell interference). In some embodiments, the process includes analyzing received UE measurement reports for a UE's signal condition. For example, the UE measurement reports can include CQI (Channel Quality Indication), CPICH (Common Pilot Channel) RSCP (Received Signal Code Power), and/or CPICH Ec/No (received energy per chip divided by the power density in the band). UEs with strong inter-cell interference signal condition can be grouped into a cell edge group. UEs without strong inter-cell interference signal condition can be grouped into a cell center group. In some embodiments, the process is repeated periodically to adapt to UE mobility and the dynamics of cellular network environment. In some embodiments, the FTR constraints as described herein are applied to each of the UEs grouped within the cell edge group. In some embodiments, the FTR constraints are not applied to UEs grouped within the cell center group.

In some embodiments, a pseudo random process is employed to select to transmit one or more subframe(s), m, for UEs grouped into the cell edge group, where is a function of PDP context QoS requirements and UE measurement report, such that $0<m \leq \hat{M}$. In some embodiments, this process can be repeated periodically to adapt to UE mobility and the dynamics of cellular network environment.

In some embodiments, various other pseudo random processes that provide for a relatively uniform distribution from 0 to $\hat{M}$ is provided. For example, the pseudo random process can generate a random number, m, with a uniform distribution from 0 to $\hat{M}$. Then m is weighted by a QoS requirement factor such that the QoS requirement factor can be the averaged QoS requirement normalized with respect to a maximum allowed QoS requirement for UEs in the cell edge group. The weighted m can be rounded to the nearest integer to be the number of transmit subframes within $\hat{M}$ for the cell edge group.

Figure 5:
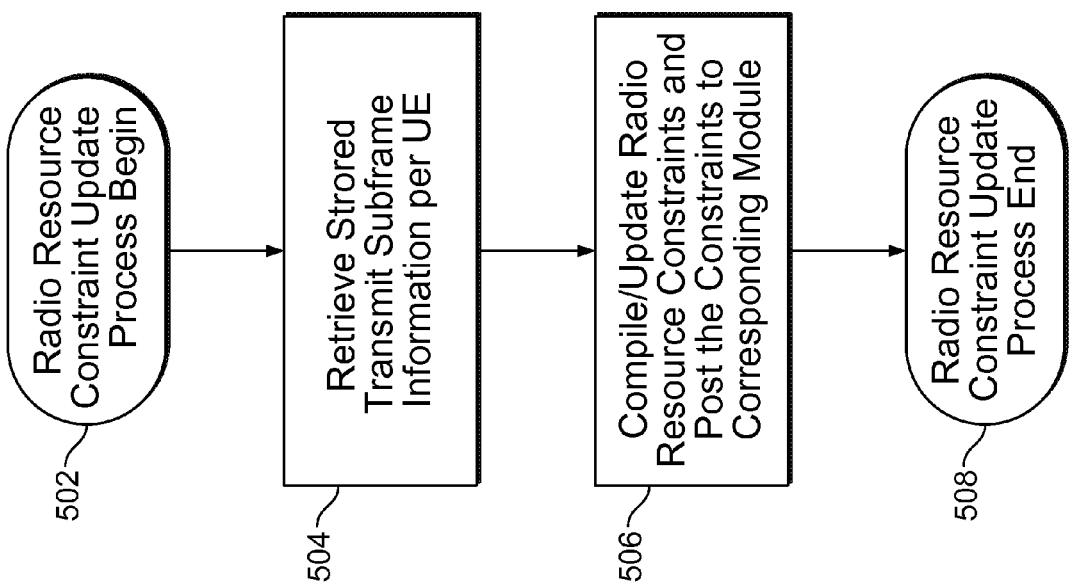
FIG. 5 illustrates a flow diagram for a radio resource constraint update process in accordance with some embodiments.

FIG. 5 illustrates a flow diagram for a radio resource constraint update process in accordance with some embodiments. As shown, at 502, a radio resource constraint update process is initiated. At 504, the stored transmit subframe information per UE is retrieved (e.g., the transmit subframe information per UE is determined and stored as described above with respect to FIG. 4). At 506, the radio resource constraints are compiled and updated, and such radio resource constraints are posted to the corresponding module (e.g., the FTR factor and transmit subframe(s) are composed into radio resource constraints and sent to the MAC transport block multiplex function). At 508, the radio resource constraint update process is completed.

In some embodiments, the FTR factor and transmit subframe(s) are composed into radio resource constraints for UEs that are grouped into a cell edge group. In some embodiments, the radio resource constraints are sent to the MAC scheduler of the base station such that the MAC scheduler shall only schedule the selected m transmit subframes out of every $\hat{M}$ subframes for UEs with predicted location in an overlapped coverage area.

In some embodiments, FTR factor and transmit subframe(s) are composed into radio resource constraints for UEs that are grouped into a cell edge group. The radio resource constraints are sent to MAC transport block multiplex function such that the MAC transport multiplex function shall only multiplex for the selected m transmit subframes out of every $\hat{M}$ subframes for UEs with predicted location in an overlapped coverage area.

In some embodiments, FTR factor and transmit subframe(s) are composed into radio resource constraints for UEs that are grouped into a cell edge group. The radio resource constraints are sent to Radio Link Control (RLC) such that the RLC shall only pass PDUs (Protocol Data Unit) to MAC layer for the selected m transmit subframes out of every $\hat{M}$ subframes for UEs with predicted location in an overlapped coverage area.

Having now fully described the inventive subject matter, it will be appreciated by those skilled in the art that the same can be performed within a wide range of equivalent modifications, variations and adaptations without departing from the scope patent disclosure.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential features hereinbefore set forth.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor of a base station configured to:
determine a number of neighboring base stations of the base station in a heterogeneous network;
select an FTR factor that is at least five times greater than an estimated average number of neighboring base stations in the heterogeneous network to provide for a greater number of FTR slots to meet the Quality of Service (QoS) requirements and reduce potential inter-cell interference; and
pseudo randomly select one or more Fractional Time Reuse (FTR) slots for transmission by the base station; and
a memory coupled to the processor and configured to provide the processor with instructions.

2. The system recited in claim 1, wherein the one or more FTR slots are autonomously selected by the base station without coordinating the selection of the one or more FTR slots with one or more of the neighboring base stations.

3. The system recited in claim 1, wherein the base station includes a femtocell, a picocell, a microcell, or a macrocell.

4. The system recited in claim 1, wherein the number of neighboring base stations of the base station in a heterogeneous network is determined during a downlink scanning and user equipment measurement for estimating the number of neighboring base stations and the signal strength of each of the neighboring base stations.

5. The system recited in claim 1, wherein the processor of the base station is further configured to:
monitor for inter-cell interference; and
pseudo randomly select one or more different FTR slots for transmission by the base station based on the monitored inter-cell interference.

6. The system recited in claim 1, wherein the processor of the base station is further configured to:
autonomously select an FTR factor using a pseudo random distribution model; and
compose the selected FTR factor and transmit subframe(s) into radio resource constraints for one or more user equipment devices associated with a cell edge group.

7. The system recited in claim 1, wherein the processor of the base station is further configured to:
autonomously select an FTR factor using a pseudo random distribution model; and
compose the selected FTR factor and transmit subframe(s) into radio resource constraints for one or more user equipment devices associated with a cell edge group, wherein the selected FTR factor is not applied to user equipment devices associated with a cell center group.

8. The system recited in claim 1, wherein the processor of the base station is further configured to:
autonomously select an FTR factor $\hat{M}$ using a pseudo random distribution model;
compose the selected FTR factor and transmit subframe(s) into radio resource constraints; and
execute a MAC scheduler, wherein radio resource constraints are received at the MAC scheduler, and wherein the MAC scheduler only schedules m transmit subframes out of every $\hat{M}$ subframes for each user equipment device with a predicted location in an overlapped cell coverage area.

9. The system recited in claim 1, wherein the processor of the base station is further configured to:
send radio resource constraints to a Radio Link Control (RLC).

10. A method for a base station, comprising:
determining a number of neighboring base stations of the base station in a heterogeneous network;
selecting an FTR factor that is at least five times greater than an average number of neighboring base stations in the heterogeneous network to provide for a greater number of FTR slots to reduce potential inter-cell interference; and
pseudo randomly selecting one or more Fractional Time Reuse (FTR) slots for transmission by the base station.

11. The method recited in claim 10, wherein the one or more FTR slots are autonomously selected by the base station without coordinating the selection of the one or more FTR slots with one or more of the neighboring base stations, and wherein the base station includes a femtocell, a picocell, a microcell, or a macrocell.

12. The method recited in claim 10, wherein the number of neighboring base stations of the base station in a heterogeneous network is determined during a downlink scanning and user equipment measurement for estimating the number of neighboring base stations and the signal strength of each of the neighboring base stations.

13. The method recited in claim 10, further comprising:
monitoring for inter-cell interference; and
pseudo randomly selecting one or more different FTR slots for transmission by the base station based on the monitored inter-cell interference.

14. The method recited in claim 10, further comprising:
autonomously select an FTR factor using a pseudo random distribution model; and
compose the selected FTR factor and transmit subframe(s) into radio resource constraints for one or more user equipment devices associated with a cell edge group.

15. The method recited in claim 10, further comprising:
autonomously select an FTR factor using a pseudo random distribution model; and
compose the selected FTR factor and transmit subframe(s) into radio resource constraints for one or more user equipment devices associated with a cell edge group, wherein the selected FTR factor is not applied to user equipment devices associated with a cell center group.

16. The method recited in claim 10, further comprising:
autonomously selecting an FTR factor $\hat{M}$ using a pseudo random distribution model; and
executing a MAC scheduler, wherein radio resource constraints are received at the MAC scheduler, and wherein the MAC scheduler only schedules m transmit subframes out of every $\hat{M}$ subframes for each user equipment device with a predicted location in an overlapped cell coverage area.

17. A computer program product for a base station, the computer program product being embodied in a tangible computer readable storage medium and comprising computer instructions for:
determining a number of neighboring base stations of the base station in a heterogeneous network;
selecting an FTR factor that is at least five times greater than an average number of neighboring base stations in the heterogeneous network to provide for a greater number of FTR slots to reduce potential inter-cell interference; and
pseudo randomly selecting one or more Fractional Time Reuse (FTR) slots for transmission by the base station.

18. The computer program product recited in claim 17 wherein the one or more FTR slots are autonomously selected by the base station without coordinating the selection of the one or more FTR slots with one or more of the neighboring base stations, and wherein the base station includes a femtocell, a picocell, a microcell, or a macrocell.

19. A system, comprising:
a processor of a base station configured to:
determine a number of neighboring base stations of the base station in a heterogeneous network;
autonomously select an FTR factor $\hat{M}$ using a pseudo random distribution model;
compose the selected FTR factor and transmit subframe(s) into radio resource constraints;
execute a MAC scheduler, wherein radio resource constraints are received at the MAC scheduler, and wherein the MAC scheduler only schedules m transmit subframes out of every $\hat{M}$ subframes for each user equipment device with a predicted location in an overlapped cell coverage area; and
pseudo randomly select one or more Fractional Time Reuse (FTR) slots for transmission by the base station; and
a memory coupled to the processor and configured to provide the processor with instructions.

20. The system recited in claim 19, wherein the one or more FTR slots are autonomously selected by the base station without coordinating the selection of the one or more FTR slots with one or more of the neighboring base stations.

21. The system recited in claim 19, wherein the base station includes a femtocell, a picocell, a microcell, or a macrocell.

22. The system recited in claim 19, wherein the number of neighboring base stations of the base station in a heterogeneous network is determined during a downlink scanning and user equipment measurement for estimating the number of neighboring base stations and the signal strength of each of the neighboring base stations.

23. The system recited in claim 19, wherein the processor of the base station is further configured to:
monitor for inter-cell interference; and
pseudo randomly select one or more different FTR slots for transmission by the base station based on the monitored inter-cell interference.

24. The system recited in claim 19, wherein the processor of the base station is further configured to:
send radio resource constraints to a Radio Link Control (RLC).

25. A method for a base station, comprising:
determining a number of neighboring base stations of the base station in a heterogeneous network;
autonomously selecting an FTR factor $\hat{M}$ using a pseudo random distribution model;
executing a MAC scheduler, wherein radio resource constraints are received at the MAC scheduler, and wherein the MAC scheduler only schedules m transmit subframes out of every $\hat{M}$ subframes for each user equipment device with a predicted location in an overlapped cell coverage area; and
pseudo randomly selecting one or more Fractional Time Reuse (FTR) slots for transmission by the base station.

26. The method recited in claim 25, wherein the one or more FTR slots are autonomously selected by the base station without coordinating the selection of the one or more FTR slots with one or more of the neighboring base stations, and wherein the base station includes a femtocell, a picocell, a microcell, or a macrocell.

27. The method recited in claim 25, wherein the number of neighboring base stations of the base station in a heterogeneous network is determined during a downlink scanning and user equipment measurement for estimating the number of neighboring base stations and the signal strength of each of the neighboring base stations.

28. The method recited in claim 25, further comprising:
monitoring for inter-cell interference; and
pseudo randomly selecting one or more different FTR slots for transmission by the base station based on the monitored inter-cell interference.

29. A computer program product for a base station, the computer program product being embodied in a tangible computer readable storage medium and comprising computer instructions for:
determining a number of neighboring base stations of the base station in a heterogeneous network;
autonomously selecting an FTR factor $\hat{M}$ using a pseudo random distribution model;
executing a MAC scheduler, wherein radio resource constraints are received at the MAC scheduler, and wherein the MAC scheduler only schedules m transmit subframes out of every $\hat{M}$ subframes for each user equipment device with a predicted location in an overlapped cell coverage area; and
pseudo randomly selecting one or more Fractional Time Reuse (FTR) slots for transmission by the base station.

30. The computer program product recited in claim 29 wherein the one or more FTR slots are autonomously selected by the base station without coordinating the selection of the one or more FTR slots with one or more of the neighboring base stations, and wherein the base station includes a femtocell, a picocell, a microcell, or a macrocell.

* * * * *